Dec. 11, 1962     L. L. HIGGINS ET AL     3,068,474
RADIO DIRECTION FINDING SYSTEM
Filed Dec. 4, 1958     2 Sheets-Sheet 1
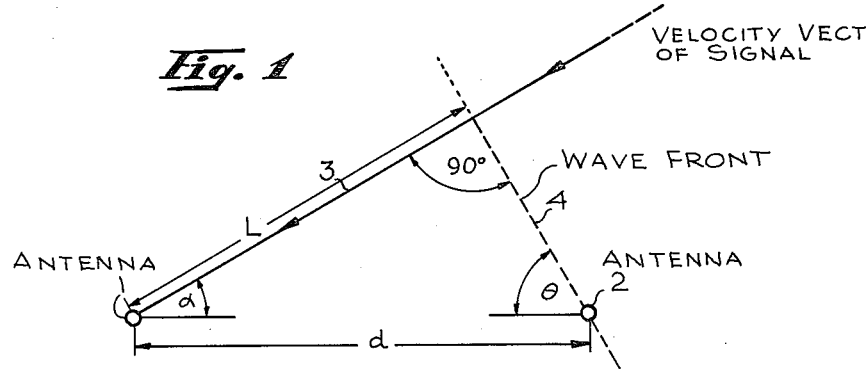
Fig. 1
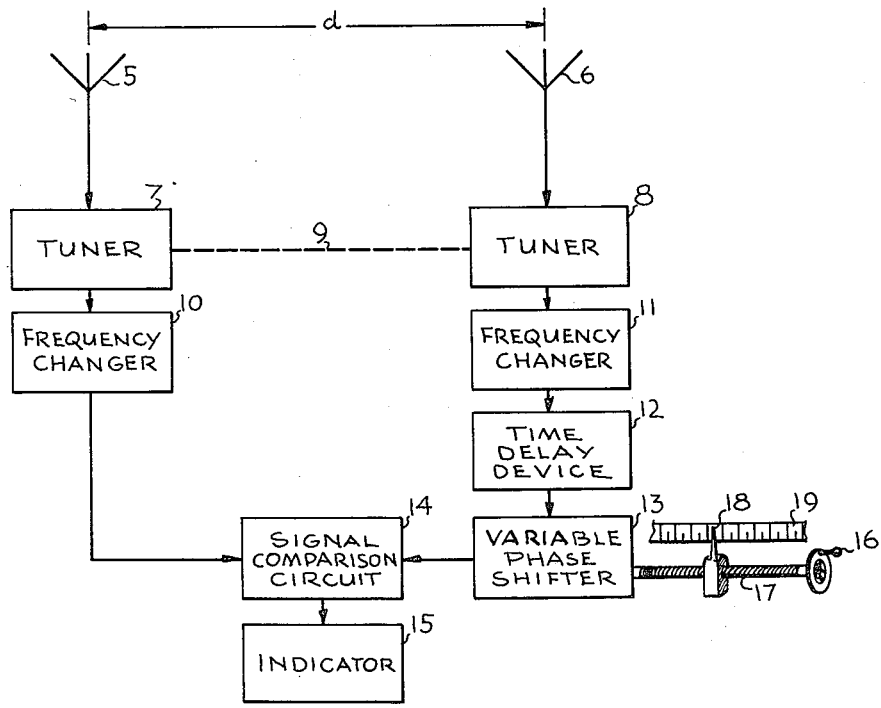
Fig. 2
CHARLES O. MALLINCKRODT,
LARRY L. HIGGINS
           INVENTORS
BY 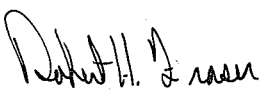
           ATTORNEY

CHARLES O. MALLINCKRODT
LARRY L. HIGGINS
INVENTORS

BY Robert H. Fraser
ATTORNEY

United States Patent Office 3,068,474
Patented Dec. 11, 1962

3,068,474
RADIO DIRECTION FINDING SYSTEM
Larry L. Higgins, Manhattan Beach, and Charles O. Mallinckrodt, Palos Verdes Estates, Calif., assignors to Thompson Ramo Wooldridge Inc., Los Angeles, Calif., a corporation of Ohio
Filed Dec. 4, 1958, Ser. No. 778,127
9 Claims. (Cl. 343—113)

This invention relates to radio direction finding systems and more particularly to a radio direction finding system of the phase measuring type in which errors attributable to noise signals are substantially eliminated.

In one known type of radio direction finding system, the relative phase of signals from a pair of spaced antennas is determined by a modulation process in which a reference wave from a local oscillator is applied directly to a first frequency changer coupled to one of the antennas and reference wave of adjustable phase from the local oscillator is applied to a second frequency changer coupled to the other of the antennas. A phase sensitive indicator is coupled to both of the frequency changers so that a predetermined phase relationship between the signals may be established by adjustment of the phase of the reference wave applied to the second frequency changer and, by measuring the amount of phase shift of the reference wave required to produce the aforesaid predetermined phase relationship, the direction of the distant source of radio signals with respect to the two antennas may be ascertained through a trigonometric calculation based upon the distance between the spaced antennas, the wave length of the received signal, and the amount of phase shift of the reference wave required to establish the predetermined phase relationship between the signals derived from the frequency changers.

A serious shortcoming of the above-described direction finding system is that it cannot reject interference from coherent noise sources, i.e. sources of interfering radio signals arriving at the pair of antennas along with the desired radio signals. For example, interfering signals comprising the side bands of modulated radio waves, interfering signals from jamming systems, and natural or man-made static signals arrive at the pair of antennas in the above-described system and are applied to the phase sensitive indicator via the frequency changers in a manner in which the interfering signals cannot be distinguished from the desired signal.

Under conditions in which both desired signals and interference signals are applied to the phase sensitive indicator, adjustment of the phase of the reference wave to produce an apparent predetermined phase relationship between the signals applied to the indicator may not correspond to the correct adjustment at which the phase sensitive indicator displays a predetermined phase relationship between the desired signals only.

The above described shortcoming of known phase measuring types of radio direction finding systems is inherent in a system in which like wave lengths of a radio signal from a distant source are applied to a phase sensitive indicator when the adjustment in the phase of one of the signals applied to a phase sensitive indicator with respect to the other of the signals applied to the phase sensitive indicator is achieved through an adjustment in the phase of a reference wave applied to a frequency changer coupled to a first one of the antennas with respect to the phase of a reference wave applied to another frequency changer coupled to the other of the spaced antennas.

Accordingly, it is a principal object of the present invention to provide a new and improved phase sensitive radio measuring system having an improved signal-to-noise ratio.

It is another object of the present invention to provide a new and improved phase sensitive radio direction finding system in which the errors due to coherent noise are substantially reduced.

It is yet another object of the present invention to provide a new and improved radio direction finding system for correlating signals received by two spaced antennas.

It is still a further object of the present invention to provide a radio direction finding system in which at least two received radio signals are recorded in separate channels for correlation of different wave lengths of the received signal to ascertain the direction of a distant source of signals.

It is another object of the present invention to provide a two-channel radio direction finding system in which the signals in one channel are delayed with respect to signals in another channel to reduce errors arising from the reception of interfering signals.

Briefly, in accordance with one aspect of the present invention, there is provided a radio direction finding system in which a pair of spaced antennas are adapted to receive signals from a distant source, a first signal channel is connected to the first antenna, a second signal channel is connected to the second antenna, the second signal channel includes means for delaying signals passing therethrough with respect to signals passing through the first signal channel, and an adjustable phase shifter is connected in one of the signal channels for establishing a predetermined phase relationship between the signals in the first signal channel with respect to signals in the second signal channel whereby the direction of a distant source of radio signals relative to the antennas may be ascertained through the position of the adjustable phase shifter.

In accordance with one particular embodiment of the present invention, a pair of frequency changers are included in two separate channels of a phase measuring radio direction finding system for producing lowered frequency signals corresponding to signals received by two separate antennas. A two-channel recorder is coupled to the frequency changers for storing each of the two separate lowered frequency signals along separate tracks of a record medium. By deriving signals from one of the tracks which are delayed with respect to signals derived from the other of the signal tracks, a wave length of the received signal from one signal channel may be compared with another wave length of the received signal from the other signal channel.

In one arrangement illustrated below, an adjustable phase shifter is included comprising a reproducing head for one of the tracks of a two channel recorder which may be adjusted in position along the track to vary the phase of one of the derived signals with respect to the other. A phase sensitive indicator may be coupled between the adjustable signal reproducing head and another reproducing head associated with another of the tracks of the recorder to display a predetermined phase relationship between the signals derived from the tracks with the position of the adjustable reproducing head representing a function of the direction of a distant source of radio signals with respect to the receiving antennas.

A better understanding of the invention may be had from a reading of the following detailed description and an inspection of the drawings, in which:

FIG. 1 is a diagrammatic illustration of a pair of spaced antennas and a signal from a distant source included for the purpose of illustrating the principles of operation of phase measuring direction finding systems;

FIG. 2 is a block diagram of a generalized form of a radio direction finding system in accordance with the invention;

Figure 3:
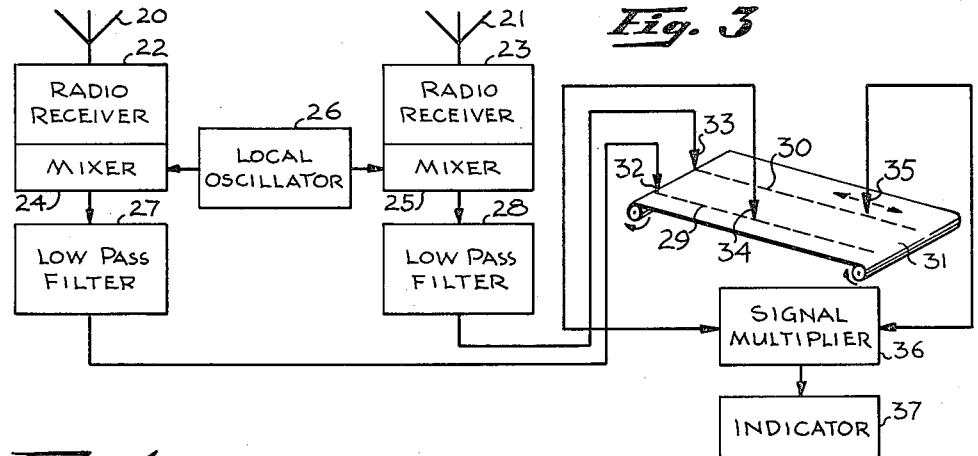
FIG. 3 is a block diagram of a particular arrangement of a radio direction finding system in accordance with the invention.

In the diagrammatic illustration of FIG. 1, there is shown a pair of spaced antennas 1 and 2 spaced apart by a predetermined distance (d). Signals received by the antennas 1 and 2 from a distant radio signal source arrive at the antennas 1 and 2 at slightly different times except in the case where the source of radio signals is positioned an equal distance from the antennas 1 and 2, i.e., along a line normal to a line drawn between the two antennas. Assuming that the radio signal arrives at the antennas 1 and 2 from a direction indicated by velocity vector line 3, a wave front 4 of the signal strikes the antenna 2 prior to striking the antenna 1. Since the velocity vector and the wave front of a radio signal are at right angles, a right triangle is formed by the wave front 4, the velocity vector 3 and a line drawn between the antennas 1 and 2. Since the distance (d) is known, and the distance (L) along the velocity vector 3 can be calculated from the wave length of the signal and the relative times of arrival of the wave front 4 at the antennas 1 and 2, a trigonometric relationship is established from which the angles ($\alpha$ and $\theta$) of the triangle may be determined.

Signals induced in the antennas 1 and 2 are displaced in phase with respect to one another due to the fact that the signal represented by the wave front 4 strikes one antenna prior to striking the other, except in the case where the source of the radio signals is at an equal distance from both antennas. Where the wave length of the received signal is known, the phase difference between the signal induced in the antenna 1 and the signal induced in the antenna 2 is equal to the distance L divided by the wave length of the received signal. Therefore, if the wave length and phase difference are known, the distance L can be calculated, and since the distance (d) is known, either angle ($\alpha$ or $\theta$) may be calculated from the trigonometric relationships of a right triangle. Thus, $$\text{cosine } \alpha = \text{sine } \theta = \frac{L}{d}$$

As noted above, radio direction finding systems are known in which signals arriving at a pair of spaced antennas are heterodyned against reference waves derived from a local oscillator which are displaced in phase by an amount which establishes a predetermined phase relationship between signals produced in the heterodyning process, but such systems suffer from the shortcoming that coherent noise signals arriving at the antennas produce false indications of the direction of desired signals arriving from a distant source.

In FIG. 2, there is illustrated a generalized form of a radio direction finding system in accordance with the invention which substantially eliminates errors arising due to coherent noise. In FIG. 2, a pair of spaced antennas 5 and 6 are each connected to separate tuners 7 and 8 by means of which radio signals being received by the antennas 5 and 6 having a predetermined wave length may be selected. In order to facilitate the tuning operation, the tuners 7 and 8 may be ganged together by means of a mechanical linkage illustrated diagrammatically by the dashed line 9. As noted above in the discussion in connection with FIG. 1, the signals received by the antennas 5 and 6 from a distant source bear a phase relationship with respect to one another in accordance with the direction of the source of signals relative to the antennas 5 and 6. Accordingly, the signals selected by the tuners 7 and 8 bear a phase relationship corresponding to the direction of the signal source and have a wave length in accordance with the adjustment of the tuners 7 and 8.

The signals from the tuners 7 and 8 may be applied to the frequency changers 10 and 11 which function to lower the frequency of received signals to fall within the operating range of a time delay device 12, a variable phase shifter 13, a signal comparison circuit 14 and an indicator 15 all of which are described in detail below.

The signals in one channel of the radio direction finding system of FIG. 2 are delayed with respect to the signals in the other channel by a time interval corresponding to an integral number of wave lengths of the received signals by means of the time delay device 12. In addition, a variable phase shifter 13 is included in one of the signal channels to alter the phase relationship of one of the recived signals with respect to the other of the received signals. The variable phase shifter 13 may form an integral part of the time delay device 12 in the manner described below in connection with FIGS. 3 and 4, or the variable phase shifter 13 may be placed in the opposite signal channel from that in which the time delay device 12 is connected. Although the time delay device 12 and the variable phase shifter 13 have been illustrated in the system of FIG. 2 as being connected between the frequency changer 11 and the signal comparison circuit 14, it will be appreciated that either the time delay device 12 of the variable phase shifter 13 may be connected at any point in either of the two separate signal channels, the important thing being the inclusion of some means in one of the signal channels for delaying one of the received signals with respect to the other of the received signals and that some means be provided for adjustably shifting the phase of one of the received signals relative to the other of the received signals.

In FIG. 2, the signal derived from the frequency changer 10 and the signal derived from the variable phase shifter 13 are applied to a signal comparison circuit 14 which functions to detect and produce a signal corresponding to the relationship between the phases of the signals applied thereto. Due to the operation of the time delay device 12 in delaying the signal in one of the signal channels relative to the received signal in the other signal channel, the signal comparison circuit 14 may be arranged to compare one wave length of the signal striking the antenna 5 with a subsequent wave length of the same signal striking the antenna 6. An indicator 15 is coupled to the signal comparison circuit 14 for displaying the condition in which a predetermined relationship obtains between the phases of the signals applied to the signal comparison circuit 14 from the frequency changer 10 and from the variable phase shifter 13.

Adjustment of the variable phase shifter 13 may be accomplished as indicated diagrammatically in FIG. 2 by means of a control knob 16 linked to the variable phase shifter 13 by a threaded shaft 17. Supported by the threaded shaft 17 is a pointer 18 associated with a scale 19 by means of which the position of the variable phase shifter 13 may be ascertained. In operation, the control knob 16 is turned until a predetermined relationship exists between the phases of the signals from the frequency changer 10 and the variable phase shifter 13 as displayed by the indicator 15. Where the signal comparison circuit 14 operates as a multiplier, the indicator 15 may be arranged to give a maximum indication when the phases of the signals applied to the signal comparison circuit 14 coincide. Where the radio direction finding system of FIG. 2 is to be employed to ascertain the direction of sources of radio signals of varying wave lengths, the scale 19 may be calibrated in terms of the phase shift required to produce an in-phase condition between the signals applied to the signal comparison circuit 14. Since the amount of phase shift required in one signal channel with respect to the other signal channel to produce an in-phase condition between the signals applied to the signal comparison circuit 14 corresponds to the difference in phase between the signals arriving at the antennas 5 and 6 from a distant source, the direction of the distant source may be calculated as described above in connection with FIG. 1 and in accordance with the following formula:

$$\cosine\ \alpha = \sine\ \theta = \frac{L}{d} = \frac{\phi\lambda}{2\pi d}$$

where $\lambda$ equals the wave length of the received signal, $\phi$ equals the amount of phase shift produced by the variable phase shifter 13 in radians and $d$ equals the distance between the antennas 5 and 6.

On the other hand, where the radio direction finding system of FIG. 2 is to be employed to ascertain the direction of distant radio signal sources of a constant wave length, the scale 19 may be calibrated directly in terms of the angle of the arriving radio wave with respect to the antennas 5 and 6 or in terms of conventional directional compass headings, if desired. Alternatively, a plurality of separate scales 19 may be arranged to cooperate with the pointer 18, several scales being assigned to commonly used wave lengths of signals from distant sources of radio signals and another of the scales being calibrated in terms of the phase shift introduced by the variable phase shifter 13 for use in connection with infrequently used wave lentghs where a separate scale calibrated directly in terms of direction is not justified.

Where interfering signals in the form of coherent noise arrive at the antennas 5 and 6 of the system of FIG. 2 along with a desired signal, an accurate determination of the direction of the source may be ascertained through signal correlation techniques since the signals applied to the signal comparison circuit 14 may be substantially delayed with respect to one another by the time delay device 12.

A particular embodiment of the invention in which a radio direction finding system is provided utilizing a two-channel recorder as a combination time delay and phase shifting device is illustrated in FIG. 3. In the apparatus of FIG. 3, signals arriving at spaced antennas 20 and 21 are passed to like radio receivers 22 and 23 in two separate signal channels. Each of the radio receivers 22 and 23 may include a mixer 24, 25 which receives a reference wave from a common local oscillator 26. The mixers 24 and 25 function to lower the frequency of the signals received by the antennas 20 and 21 of the radio receivers 22 and 23 within the operating range of the remainder of the apparatus described in detail below. The mixers 24 and 25 may comprise conventional modulators which produce through a heterodyning process a wave having a frequency corresponding to the difference between the frequency of the signals from the radio receivers 22 and 23 and the frequency of the local oscillator 26. The difference frequency waves may be separated from the other modulation products produced by the mixers 24 and 25 by means of conventional low-pass filters 27 and 28.

In the apparatus of FIG. 3, the signals passed by the low-pass filters 27 and 28 are recorded along separate tracks 29 and 30 on a record medium 31 by means of a pair of recording transducers 32 and 33. Since received signals from the distant source arriving at the antennas 20 and 21 bear a phase relationship representing a function of the direction of the distant source relative to the antennas 20 and 21, the signals recorded along the tracks 29 and 30 likewise bear a phase relationship representing the function of the source of signals. In addition, interfering signals in the form of coherent noise arriving at the antennas 20 and 21 may be passed through the two channels of the radio direction finding system of FIG. 3 to be recorded on the tracks 29 and 30 in a phase relationship other than that of the desired signals from the distant signal source. While for many purposes it may be desirable to prepare a recording of the received signals for future use in an auxiliary playback unit, in the apparatus of FIG. 3, apparatus for deriving the recorded signals is illustrated as being a part of a two-channel signal storage device including the recording transducers 32 and 33. However, it will be appreciated that the record medium 31 may be readily transferred to a separate playback unit, if desired. Thus, a fixed reproducing transducer 34 is arranged to derive signals recorded along the track 29, and a reproducing transducer 35 spaced apart from the reproducing transducer 34 by a distance along the record medium 31 corresponding to at least one integral wave length of the signals recorded on the tracks 29 and 30 is arranged to derive signals from the other track 30. Signals derived from the reproducing transducers 34 and 35 are applied to a signal multiplier 36 which functions to compare one wave length of the signals received by the antennas 20 and 21 with another wave length of the signals received by the antennas 20 and 21 so that coherent noise signals appearing predominantly in one wave length of the received signal do not create a false phase relationship between the signals derived from the tracks 29 and 30 by the reproducing transducers 34 and 35.

In the apparatus of FIG. 3, means for shifting the phase of one of the received signals with respect to the other of the received signals is combined with the integral wave length delay device in the two-channel recorder by constructing the reproducing transducer 35 so as to be adjustable in its position along the track 30. Since the relationship in phase between the signals derived by the reproducing transducer 34 and the signals derived by the reproducing transducer 35 depends upon the spacing between the reproducing transducers 34 and 35 by adjustment of the reproducing transducer 35, along the length of the track 30, the derived signals applied to the signal multiplier 36 may be brought into a predetermined phase relationship. The signal multiplier 36 functions as a phase sensitive detector to apply a signal to the indicator 37 corresponding to the relationship in the phases of the signals supplied thereto. Where the indicator 37 is arranged to display a maximum indication corresponding to the condition in which the signals applied to the signal multiplier 36 are in-phase, the position of the reproducing transducer 35 may be calibrated by means of a pointer and scale such as that illustrated in FIG. 2 for measuring the amount of phase shift required to establish the in-phase condition.

As noted above, where the wave length of the received signal is known, the direction of the distant source of radio signals may be readily calculated, or the scale associated with the position of the reproducing transducer 35 may be directly calibrated in terms of the direction of radio signals striking the antennas 20 and 21.

As noted above in connection with FIG. 2, where coherent noise is received by a phase sensitive direction finding system in accordance with the invention, the accuracy of determining the direction of a source of distant radio signals may be improved through signal correlation techniques. Although the theory of correlation measurements is relatively complex, for the purposes of the present discussion it will suffice to explain the theory of operation in a qualitative way by means of the drawing of FIG. 4.

Figure 4:
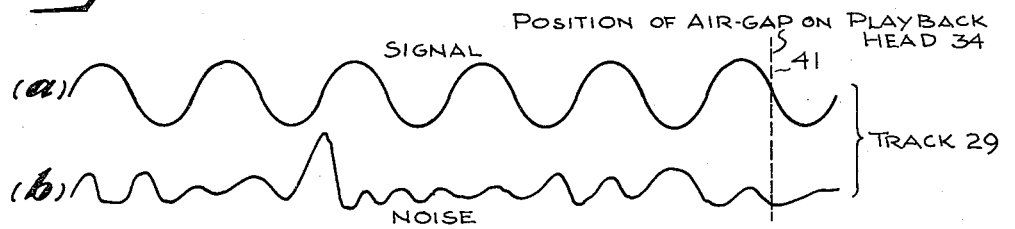
FIG. 4 is a set of graphical illustrations of various signals appearing in the radio direction finding systems of FIGS. 2 and 3.

FIG. 4 illustrates the signal and noise voltages which might be recorded on each of the two tracks 29 and 30 of the tape 31. The signal and noise in each case are pictured separately which is justified on the basis that the system is a linear one. The two sine wave signals illustrated in FIG. 4(a) and (c) are assumed to be those received from a transmitter whose position is to be located and the noise signals illustrated in FIGS. 4(b) and (d) are indicative of what might be received from a coherent noise source. If a phase correlation were obtained by displacing a playback head arranged in a position corresponding to the dashed line 40 relative to another playback head arranged in a position corresponding to the dashed line 41 by no more than one cycle of the desired signal, then the output of the signal multiplier 36 of FIG.

3 would depend both upon the correlation of the noise signal and the correlation of the wanted signal. The presence of the noise signal would produce an error in the phase determination with a consequent error in determining the direction of the distant source. Since the magnitude of the error is a function of the signal to noise ratio, the error might be as great as the quantity being measured if the signal to noise ratio were equal to unity.

To minimize the effect of the coherent noise and to substantially eliminate errors arising due to coherent noise, the position of the playback head in the arrangement of FIG. 3 is displaced by a distance which may be equal to many wave lengths of the wanted signal from the position identified by the dashed line 40. Thus, in FIG. 4, a dashed line 42 represents a reference position from which signals may be derived from one track which are delayed in time with respect to signals derived from the other track. Accordingly, the arrangement of FIG. 3 is functionally similar to that described above in connection with FIG. 2 in which a time delay device 12 functions to delay the signal in one channel with respect to the other channel by a number of wave lengths. To correct the relative phases of the signals in the arrangement of FIG. 3, a playback head arranged in the region of the dashed line 42 (FIG. 4) may be varied in position by not more than one wave length until a maximum reading is obtained on the indicator 37. A sharp signal correlation is thus obtained for the wanted signal while substantially no correlation is obtained on the noise signal due to its non-cyclic pattern. Therefore, errors in phase determination due to interference from coherent noise are substantially eliminated.

Figure 5:
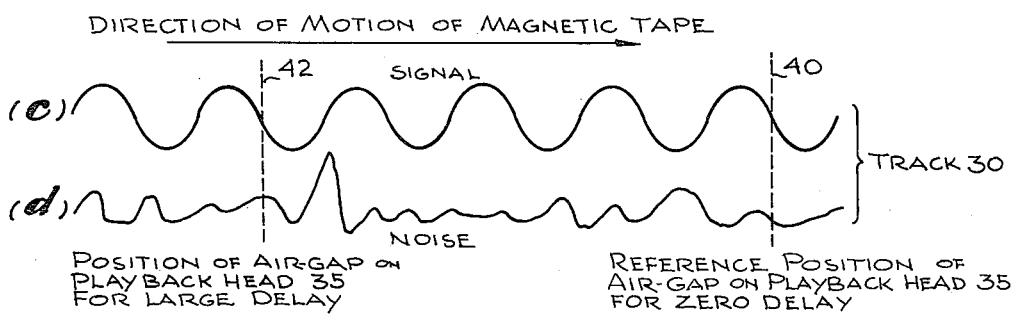
FIG. 5 is a diagrammatic illustration of a magnetic tape recorder for use in connection with the radio direction finding systems of the invention illustrated in FIGS. 2 and 3.
Figure 5:
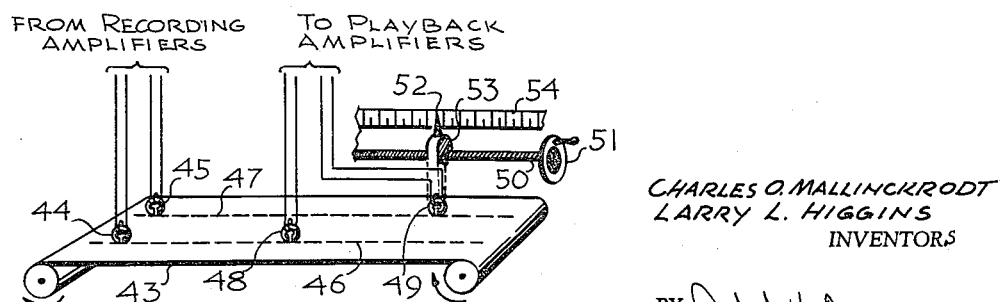

FIG. 5 illustrates diagrammatically one form of a combination signal storage, time delay and phase shifting arrangement in which a storage medium 43 comprises a tape having a magnetizable surface. A pair of recording transducers 44 and 45 are arranged to record signals received by a direction finding system similar to FIG. 3 and amplified by recording amplifiers (not shown) for storage along two separate tracks 46 and 47 of the tape 43. A fixed playback transducer 48 is associated with one of the tracks 46 while a second playback transducer 49 is associated with the other of the tracks 47. The transducer 49 may be mounted on a suitable adjustable transporting mechanism such as a threaded shaft 50 which is adapted to be turned by hand wheel 51 to alter the position of the playback head 49 with respect to the playback head 48. A pointer 52 may be attached to a carriage 53 to which the playback transducer 49 is attached so that the position of the playback transducer 49 may be accurately determined by reference to a scale 54. As described above in detail in connection with FIG. 2, the scale 54 may be directly calibrated in terms of direction or may be calibrated in terms of the phase shift required to produce a predetermined phase relationship between the signals derived from the playback transducers 48 and 49 from which the direction of a source of radio signals may be calculated. As in FIG. 3, signals derived from the playback transducers 48 and 49 may be applied to a signal multiplier and indicator after having been amplified in conventional playback amplifiers (not shown).

By means of the present invention, there is provided a new and improved phase sensitive radio direction finding system by means of which the effects of coherent noise are substantially eliminated. Where the system is used in conjunction with a recording system such as that illustrated in FIG. 5, a permanent record of the received signals is produced which may be analyzed at a subsequent time for determination of the direction of a received radio signal. Accordingly, the apparatus is well adapted for use on a continuously monitoring basis to determine the position of mobile transmitters in aircraft or the like where the signals may be analyzed for direction determination only as required, as in the event of a crash landing or request by an aircraft for a position determination.

Although particular arrangements of the invention have been described in detail above for purposes of illustration, it will be appreciated that the invention is not limited thereto. Accordingly, the invention should be given the full benefit of any and all modifications, variations or equivalent arrangements falling within the scope of the annexed claims.

We claim:
1. A radio direction finding system including the combination of a first antenna for receiving signals from a distant source, a second antenna spaced apart from the first antenna for receiving signals from the same distant source, a first signal channel coupled to the first antenna, a second signal channel coupled to the second antenna, means for delaying the signals in one of said signal channels with respect to the other of said signal channels by a time interval at least as great as a time interval corresponding to the wave length of the signals passing through said signal channels, said delaying means including a fixed delay means producing a time delay equal to said signal wave length and a variable phase shifter for introducing an additional time delay variable over a range not exceeding the time interval of said signal wave length, means comparing the phase of the signal derived from the signal delaying means and the signal in the other signal channel, and means for determining the direction of a radio wave received by said first and second antennas in accordance with the difference in phase between the signals in said first and second signal channels.

2. In a radio direction finding system, the combination of a first antenna for receiving signals from a distant source, a second antenna spaced apart from the first antenna by a predetermined distance for receiving signals from the same distant source, a first signal channel connected to the first antenna, a second signal channel connected to the second antenna, said second signal channel including means for delaying signals by a time interval corresponding to at least one wave length of the received signals, one of said signal channels including an adjustable phase shifter for adjusting the phase of the signals in one of the signal channels relative to the phase of the signals in the other signal channel over a range not in excess of said one wave length, an indicator coupled to the first signal channel and the second signal channel for indicating the condition in which the signals applied to the indicating device bear a predetermined phase relationship, and means movable with the adjustable phase shifter for measuring the amount of phase shift introduced by said phase shifter to determine the direction of the radio signals received by said first and second antennas.

3. In a radio direction finding system, the combination of a first antenna for receiving radio signals from a distant source, a second antenna spaced from the first antenna by a predetermined distance for receiving radio signals from said distant source, a local oscillator, a first mixer coupled between the local oscillator and the first antenna for generating a wave corresponding to signals received by the first antenna, a second mixer coupled between the local oscillator and the second antenna for generating a wave corresponding to signals received by the second antenna, a two-channel signal storage device coupled to said first and second mixers for storing the waves supplied by each of said mixers in separate chanels, means for retrieving signals stored in the storage device with a first predetermined time delay along a first one of the channels, means for retrieving signals stored in the storage device along a second one of the channels with a variable delay greater than said first predetermined time delay by an interval not less than the time for one wave length of the generated waves from the first and second mixers, said second channel signal retrieving means being oriented with respect to the first channel signal retrieving means so that signals derived from the second channel are delayed by at least one wave length with respect to signals derived from the first channel, and comparison means coupled to both said signal deriving means for comparing the phase of the signal derived from the first channel with the phase of the signal derived from the second channel, whereby the direction of the radio signal received by said first and second antennas may be determined.

4. A radio direction finding system including the combination of a first antenna for receiving signals from a distant source, a second antenna spaced apart from the first antenna for receiving signals from the same distant source, a first signal channel coupled to the first antenna, a second signal channel coupled to the second antenna, a two-channel recording device coupled to the first and second channels for storing electrical signals derived from each of said channels separately, means for deriving recorded signals from the recording device representing signals passed by the first signal channel with a first predetermined time delay, means deriving signals from the recording device corresponding to the signals from a second signal channel which are displaced by a second time delay in excess of one wave length with respect to the recorded signals derived corresponding to the signals from the first signal channel, said last named signal deriving means being adjustable to alter the phase of the recorded signals corresponding to the signals from the second signal channel with respect to the phase of the signals in the first signal channel, an indicator coupled to the signal deriving means for displaying a predetermined phase relationship between the signals derived from the recording device, and means for measuring the position of the adjustable signal deriving means for determining the direction of the distant source with respect to the first and second antennas.

5. Apparatus in accordance with claim 4 in which the recording device comprises a two-track recorder in which signals from each of said signal channels are recorded in separate tracks, and said signal deriving means comprises reproducing heads for deriving information from the signal tracks of the recording device with one of the reproducing devices being movable over a range corresponding to a time delay less than said signal wave length to adjust the phase of the derived signal from one track with respect to the derived signal from the other track.

6. A radio direction finding system for ascertaining the direction of a single frequency radio transmitter comprising a pair of receiving antennas spaced apart to receive signals from said transmitter, first and second signal channels respectively coupled to said antennas, a first signal delay device coupled to said first signal channel for delaying the signals processed therein by a first predetermined amount, a second signal delay device coupled to said second channel for delaying the signals processed therein by a second predetermined amount, the time delay of said second delay device being arranged to exceed the time delay of said first delay device by at least one wave length of the signals processed by said first and second channels, a signal multiplying circuit coupled to said first and second channels for correlating the output signals therefrom, and means for adjusting the delay of said second time delay device over a limited range not exceeding one wave length in order to develop a correlation signal from the signal multiplying circuit which may be employed for ascertaining the direction of the radio signal transmitter.

7. A radio direction finding system in accordance with claim 6 wherein said first and second delay devices comprise a movable two-track recording medium having recording and playback heads associated with one track separated from each other by a fixed distance and the recording and playback heads associated with the other track separated by a variable distance, and means associated with the movable head of said second track for indicating the degree of phase shift of the signal from the second track.

8. A radio direction finding system in accordance with claim 7 wherein said indicating means comprises a movable pointer attached to the movable head of the second track and a scale associated with said pointer calibrated in degrees of azimuthal direction of the radio transmitter from the antennas.

9. A radio signal direction finding system including the combination of a first radio receiver, a second radio receiver spaced apart from the first radio receiver by a predetermined distance, a common local oscillator connected to both said first and second radio receivers, a first signal channel connected to the first radio receiver for passing received signals, a second signal channel connected to the second radio receiver for passing received signals, one of said signal channels including means for delaying received radio signals by a time interval corresponding to at least one wave length of the received signals, means for adjustably shifting the phase of the received signals in one of said signal channels relative to the received signals in the other of said signal channels, said delaying means and said adjustable phase shifting means including a record medium having first and second tracks, a first transducer coupled to the first signal channel for recording on the first track of the record medium indicia corresponding to the signal from the first signal channel, a second transducer coupled to the second signal channel for recording on the second track of the record medium indicia corresponding to the received signals from the second signal channel, a fixed reproducing head associated with the first track for deriving signals recorded therein, a second adjustable reproducing head associated with the second track and spaced apart from the first reproducing head by a distance along the record medium corresponding to at least one wave length of the received signals, an indicator coupled to both said first and second signal channels for displaying a predetermined relationship between the phases of the received signals in the first signal channel and the delayed received signals in the second signal channel, means for adjusting the phase shifting means to secure a predetermined indicated phase relationship between the signals applied to the indicator whereby the direction of a source of radio signals relative to the first and second receivers may be ascertained from the position of the adjustable phase shifting means, and means coupling the first and second reproducing heads to the indicator whereby the position of the second adjustable reproducing head may be varied to alter the phase relationship between the signals applied to the indicator so that the position of the adjustable reproducing head is a function of the direction of a source of radio signals relative to the first and second receivers when a predetermined phase relationship is displayed by the indicator.

References Cited in the file of this patent

UNITED STATES PATENTS

| | | |
|---|---|---|
| 2,166,991 | Guanella | July 25, 1939 |
| 2,800,654 | De Rosa | July 23, 1957 |
| 2,914,762 | Gross et al. | Nov. 24, 1959 |